Sept. 17, 1935.  J. CULEMEYER  2,014,369
TIPPING APPARATUS FOR RAILWAY TRUCKS AND THE LIKE
Filed Feb. 21, 1934  2 Sheets-Sheet 1
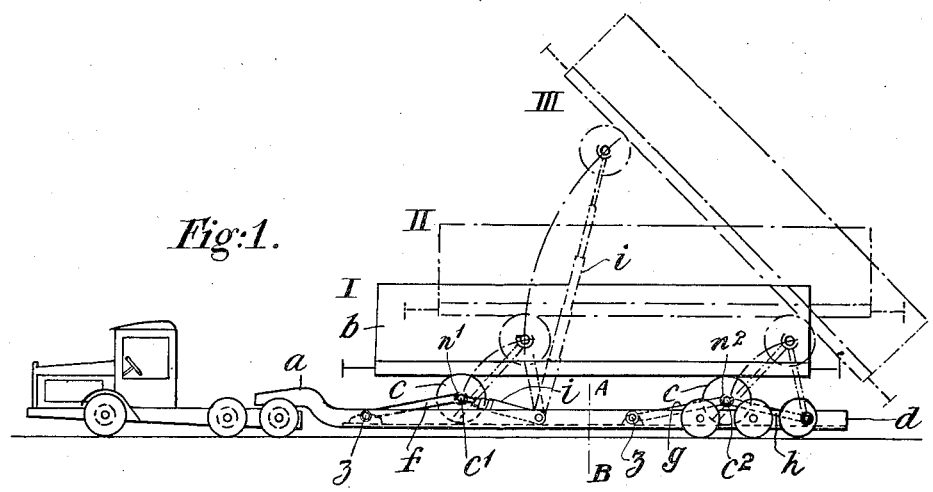
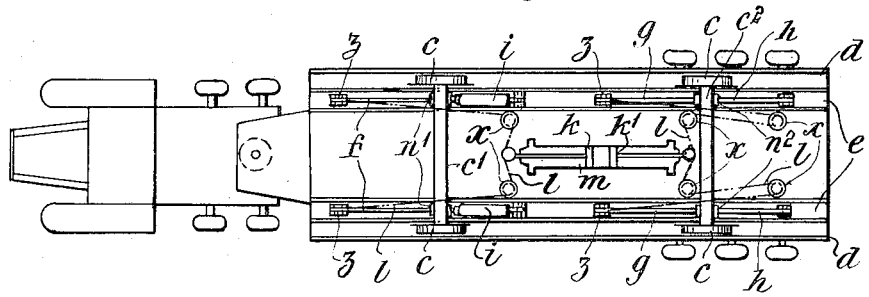
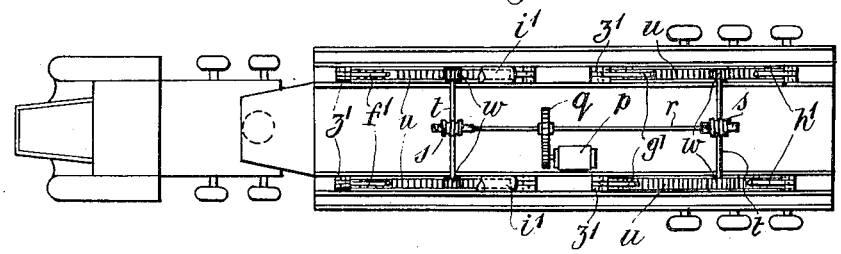
Inventor:
Johann Culemeyer.
by R. Maddau
his Attorney.

Patented Sept. 17, 1935

2,014,369

UNITED STATES PATENT OFFICE 2,014,369

TIPPING APPARATUS FOR RAILWAY TRUCKS AND THE LIKE

Johann Culemeyer, Berlin-Charlottenburg, Germany, assignor to Gothaer Waggonfabrik Aktiengesellschaft, Gotha, Germany Application February 21, 1934, Serial No. 712,428
In Germany February 23, 1933

4 Claims. (Cl. 214—44)

In tipping apparatus for railway trucks and the like it is now usual to have a platform which is tilted with the truck standing thereon. The apparatus may be stationary, or portable for transport of the truck on the road. In some cases the platform has a hinge joint, and part of it, with two of the truck wheels on it, remains horizontal while the other part is tilted. With this latter arrangement there is no lifting of the truck as a whole, and for some purposes the platform must then be at a considerable elevation above the ground, but such elevation is on other grounds not desirable in the case of an apparatus mounted on wheels for road transport with the truck upon it, as it raises the center of gravity and may prevent passage with a loaded truck under bridges or through subways.

My invention, now to be described, enables the truck to be supported at a low level, but nevertheless to be tipped at a more suitable elevation, the truck being lifted before it is tipped. For this purpose I use mechanism adapted to engage the truck axles at the low level, and to lift first both axles and then one axle. The mechanism may be made adjustable to suit trucks of different lengths and widths.

Two embodiments of the invention are shown by way of example in the accompanying drawings.

Figure 3:
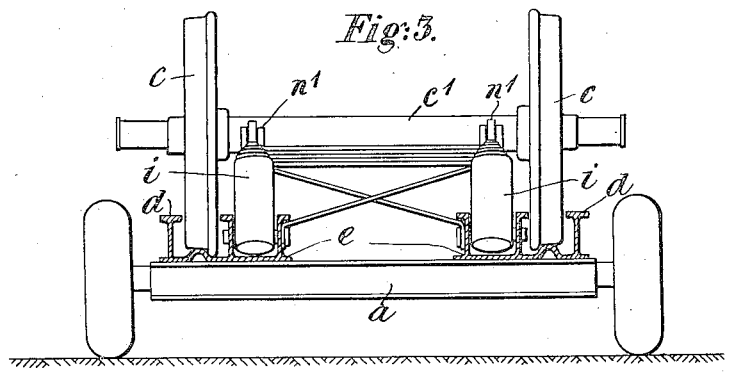
Figure 4:
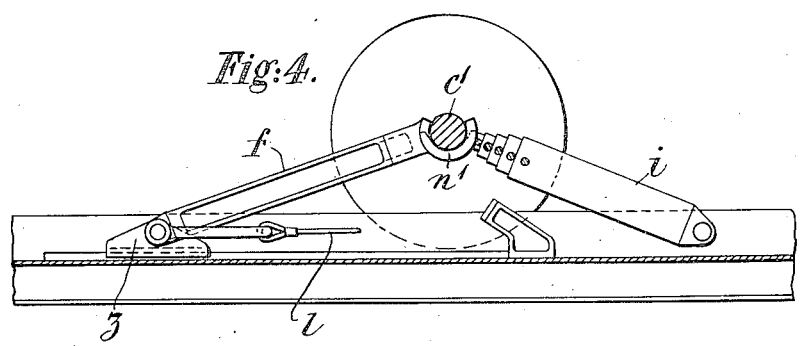
Figure 6:
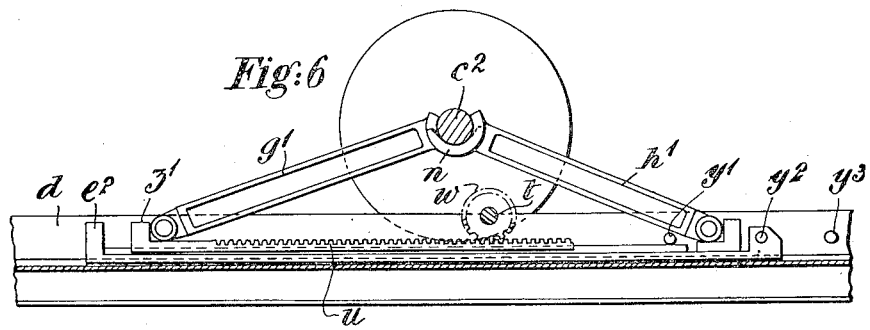

Fig. 1 is a side elevation of one of them, and
Fig. 2 is a plan view thereof.
Fig. 3 is a vertical cross-section on the line A—B of Fig. 1.
Fig. 4 shows a detail of the lifting and tipping mechanism, to a larger scale.
Fig. 5 is a plan view of the other embodiment illustrated and Fig. 6 shows a detail thereof, to a larger scale.

In both the examples illustrated the apparatus is vehicular, for road transport, and may be used as a trailer with a motor tractor, as indicated in Figs. 1, 2 and 3, but it will be understood that it may also be constructed as a stationary apparatus, without road wheels.

Referring first to the embodiment shown in Figs. 1, 2 and 3, there is a platform $a$ mounted on road wheels, for supporting the truck $b$, the wheels $c$ of which stand on rails within channelled beams $d$ laid on the platform. Somewhat farther towards the longitudinal center line of the platform there are two beams $e$, and the lifting and tipping mechanism is disposed between the beams $e$ and the adjacent beams $d$. For one axle of the truck, shown at $c^1$ in Fig. 4, there are two toggle levers, one on each side of the platform, each consisting of two toggle arms $f$, $i$, with a dished knuckle $n^1$ engaging the axle, the toggle member $f$ being a rigid arm pivoted to a slide $z$, and the toggle member $i$ being telescopic and capable of being extended by means of compressed air or liquid under pressure admitted thereto. For the other axle $c^2$ of the truck there are two toggles, each consisting of two rigid toggle arms $g$, $h$, with a knuckle $n^2$ engaging the axle. The knuckles engage the axles close to the truck wheels, to reduce bending stress.

Each of the toggle arms $f$ and $g$ is pivoted to a slide $z$, and the slides $z$ are connected to chains or the like $l$, which pass over pulleys $x$ and are connected to the rods of pistons $k$, $k^1$ working in opposite directions in a cylinder $m$, so that admission of air or liquid to the cylinder under pressure drives the pistons apart and causes the chains to pull the slides $z$, and the toggle levers are thereby caused to lift the truck $b$ in a horizontal position from the position I shown in Fig. 1 to the position II indicated by broken lines in the same figure. Then compressed air or liquid under pressure is admitted to the telescopic toggle members $i$, causing them to be extended and operate as rams, tipping the truck $b$ into the position III indicated by broken lines in Fig. 1. To allow of this action the knuckles $n^1$ come apart, of course, dished portions thereof carried by the toggle members $i$ remaining in engagement with the axle $c^1$. The toggle members $f$ are retained by spring catches or the like in the position to which they have been moved for lifting the truck to position II, so that they re-engage the axle when the truck is swung back to that position.

Instead of rigid toggle members $f$, $g$ connected to slides I may use jointed members which themselves constitute complete toggles, normally flexed but adapted to lift the truck to position II when extended.

In the embodiment shown in Figs. 5 and 6 there are likewise two pairs of toggle levers. In one pair each of the levers has two rigid arms $g^1$, $h^1$, and in the other pair each toggle lever has a rigid arm $f^1$ and a telescopic arm $i^1$. As best shown in Fig. 6 the rigid arms $g^1$ are pivoted to slides $z^1$, and the arms $f^1$ are similarly pivoted to slides $z^1$, and the slides are provided with racks $u$ engaged with pinions $w$ on shafts $t$, these shafts being connected by worm gears $s$ to a shaft $r$ with a gear wheel $q$ thereon, driven by an electromotor $p$, so that the slides $z^1$ can be moved by the motor, for actuating the toggle levers.

It will be clear that other kinds of mechanism may be used for actuating the toggle levers, e. g. chains or the like attached to pulleys.

To enable the distance between the two pairs of toggle levers to be regulated according to the distance between the truck axles, the toggle levers for one axle, or each axle, may be mounted on carriers $e^2$, as shown in Fig. 6, which can be adjusted, lengthwise of the platform $a$ and can be fixed in selected positons by means of pins inserted into holes $y^1$, $y^2$, $y^3$ in the beams $d$.

What I claim as my invention and desire to secure by Letters Patent of the United States is:—

1. Tipping apparatus for railway trucks and the like comprising two toggle lever mechanisms, each having a knuckle adapted to engage one axle of a truck, one toggle arm of one of said mechanismss being telescopic and disconnectible from its complementary toggle member when the toggle is flexed, means for flexing said toggle mechanisms simultaneously, for lifting both axles of the truck, and means for extending said telescopic arm after the flexing, for further lifting one of said axles.

2. Tipping apparatus for railway trucks and the like comprising in combination two toggle levers adapted to engage and lift one of the axles of a truck, one of said levers having a telescopic arm adapted to be extended by internal fluid pressure, means for flexing said toggle levers, and means for extending said telescopic lever arm, said telescopic arm being disconnectible from the complementary lever arm.

3. Tipping apparatus for railway trucks comprising in combination two toggle mechanisms, each comprising two levers having dished ends adapted to engage one of the truck axles, means for actuating said toggle mechanisms simultaneously, for lifting the truck axles uniformly, and means for actuating one lever of one of said mechanisms after said uniform lifting, for imparting a further lift to one of said axles.

4. Tipping apparatus for railway trucks comprising in combination two toggle lever mechanisms, each having a knuckle adapted directly to engage one of the truck axles, one of said mechanisms comprising two levers having dished ends engaging under the respective truck axle, means for actuating said toggle mechanisms simultaneously, for lifting both said axles, and means for lifting the dished end of one of said levers, after said uniform lifting, for imparting a further lift to one of said axles.

JOHANN CULEMEYER.